US010310884B2

(12) United States Patent
Ansari et al.

(10) Patent No.: US 10,310,884 B2
(45) Date of Patent: Jun. 4, 2019

(54) VIRTUAL MACHINE PLACEMENT IN A HETEROGENEOUS DATA CENTER

(71) Applicants: Huawei Technologies Co., Ltd., Shenzhen (CN); New Jersey Institute of Technology, Newark, NJ (US)

(72) Inventors: Nirwan Ansari, Newark, NJ (US); Xiang Sun, Newark, NJ (US)

(73) Assignees: Huawei Technologies Co., Ltd., Shenzhen (CN); New Jersey Institute of Technology, Newark, NJ (US)

(*) Notice: Subject to any disclaimer, the term of this patent is extended or adjusted under 35 U.S.C. 154(b) by 161 days.

(21) Appl. No.: 15/280,761

(22) Filed: Sep. 29, 2016

(65) Prior Publication Data
US 2017/0344394 A1  Nov. 30, 2017

Related U.S. Application Data

(60) Provisional application No. 62/343,372, filed on May 31, 2016.

(51) Int. Cl.
*G06F 9/455* (2018.01)
*G06F 9/50* (2006.01)
*H04L 12/911* (2013.01)

(52) U.S. Cl.
CPC ........ *G06F 9/45558* (2013.01); *G06F 9/5077* (2013.01); *H04L 47/822* (2013.01);
(Continued)

(58) Field of Classification Search
None
See application file for complete search history.

(56) References Cited

U.S. PATENT DOCUMENTS 9,323,561 B2 * 4/2016 Ayala .................... G06F 9/5072

OTHER PUBLICATIONS

Birke et al., "Research Report—Data Centers in the Wild: A Large Performance Study," RZ 3820, IBM (Apr. 18, 2012).
(Continued)

*Primary Examiner* — Wissam Rashid
(74) *Attorney, Agent, or Firm* — Leydig, Voit & Mayer, Ltd.

(57) ABSTRACT

An embodiment of the disclosure provides a method, performed by a resource management server, for mapping a plurality of unassigned virtual machines (VMs) to a plurality of physical machines (PMs). The resource management server includes a non-transient computer readable medium and a processor to execute computer executable instructions stored on the non-transient computer readable medium, so that when the instructions are executed, the resource management server performs the method of: (a) obtaining a total resource demand for each dimension requested by the plurality of unassigned VMs; (b) activating at least one PM in the plurality of PMs to create a set of activated PMs; (c) assigning at least one unassigned VM to the set of activated PMs, wherein a VM assigned to a PM has an equal or lower resource demand for each dimension compared to a remaining resource capacity for each respective dimension of the PM; (d) determining whether all unassigned VMs have been assigned to a PM in the set of activated PMs; and (e) conditionally activating one or more PMs when all unassigned VMs have not been assigned to a PM in the set of activated PMs.

15 Claims, 8 Drawing Sheets

(52) U.S. Cl.
CPC ............ *G06F 2009/4557* (2013.01); *G06F 2009/45595* (2013.01)

(56) References Cited

OTHER PUBLICATIONS

Reiss et al., "Heterogeneity and Dynamicity of Clouds at Scale: Google Trace Analysis," SoCC '12 Proceedings of the Third ACM Symposium on Cloud Computing, Article No. 7, San Jose, California, ACM, New York, New York (Oct. 14-17, 2012).
"Google/cluster-data," http://code.google.com/p/googleclusterdata/ (Published no later than Nov. 1, 2016).
Sun et al., "Applying ARIMA Model to Predict Applications Workload in a Data Center," (Published no later than Nov. 1, 2016).
Rotem et al., "Energy management of highly dynamic server workloads in an heterogeneous data center," 2014 24th International Workshop on Power and Timing Modeling, Optimization and Simulation (PATMOS), Institute of Electrical and Electronics Engineers, New York, New York (2014).
Zhang et al., "Analysis and Modeling of Dynamic Capacity Provisioning Problem for a Heterogeneous Data Center," 2013 Fifth International Conference on Ubiquitous and Future Networks (ICUFN), Institute of Electrical and Electronics Engineers, New York, New York (2013).
Zhang et al., "A Novel Resource Allocation Algorithm for a Heterogeneous Data Center," Institute of Electrical and Electronics Engineers, New York, New York (2013).
Xiao et al., "Dynamic Resource Allocation Using Virtual Machines for Cloud Computing Environment," IEEE Transactions on Parallel and Distributed Systems, vol. 24, Issue 6, pp. 1107-1117, Institute of Electrical and Electronics Engineers, New York, New York (Jun. 2013).
Bobroff et al., "Dynamic Placement of Virtual Machines for Managing SLA Violations," pp. 119-128, Institute of Electrical and Electronics Engineers, New York, New York (2007).
Zhang et al., "Heterogeneity Aware Dominant Resource Assistant Heuristics for Virtual Machine Consolidation," Globecom 2013—Communication QoS, Reliability and Modelling Symposium, pp. 1297-1302, Institute of Electrical and Electronics Engineers, New York, New York (2013).
Singh et al., "Server-Storage Virtualization: Integration and Load Balancing in Data Centers," SC2008 Proceedings of the 2008 ACM/IEEE Conference on Supercomputing, Institute of Electrical and Electronics Engineers, New York, New York (2008).
Chen et al., "Research Article; MTAD: A Multitarget Heuristic Algorithm for Virtual Machine Placement," International Journal of Distributed Sensor Networks, vol. 2015, Article ID 679170, pp. 1-14, Hindawi Publishing Corporation, Cairo, Egypt (Jan. 2015).
Xu et al., "Multi-objective Virtual Machine Placement in Virtualized Data Center Environments," 2010 IEEE/ACM International Conference on Green Computing and Communications & 2010 IEEE/ACM International Conference on Cyber, Physical and Social Computing, pp. 179-188, Institute of Electrical and Electronics Engineers, New York, New York (2010).
"WorldCup98," http://ita.ee.lbl.gov/html/contrib/WorldCup.html (Published no later than Nov. 1, 2016).

* cited by examiner

|  | CPU capacity | Memory capacity |
|---|---|---|
| PM cluster 1 | 1.5 | 1 |
| PM cluster 2 | 1 | 1.6 |

FIG. 5B

|  | CPU demand | Memory demand |
|---|---|---|
| VM1 | 0.5 | 0.51 |
| VM2 | 0.8 | 0.52 |
| VM3 | 0.51 | 0.8 |
| Total demand | 1.81 | 1.83 |

VIRTUAL MACHINE PLACEMENT IN A HETEROGENEOUS DATA CENTER

CROSS-REFERENCE TO RELATED APPLICATIONS

This application claims the benefit of U.S. Provisional Application No. 62/343,372, filed on May 31, 2016, which is hereby incorporated by reference in its entirety.

BACKGROUND

Data centers provide a platform for users to run applications. A data center usually contains a number of computer servers which provide hardware and software resources for storage, management and dissemination of data and information related to the applications. Using these hardware and software resources, data centers may provide elastic services in terms of Infrastructure as a Service (IaaS), Platform as a Service (PaaS), or Software as a Service (SaaS) to users based on user demands.

The servers of the data center may also provide a plurality of virtual machines, one or a subset of which are used to run applications. A virtual machine is an operating system or an application environment that is run within a current operating system on a computer as one of its programs. The selection of virtual machines chosen to run the applications depends on a workload of each of the applications.

The management of both the hardware and software resources of a data center has a significant impact on the cost of operating the data center. The efficient management of the resources of the data center depends on the organization of the resources based on the workloads of the applications.

SUMMARY

An embodiment of the disclosure provides a method, performed by a resource management server, for mapping a plurality of unassigned virtual machines (VMs) to a plurality of physical machines (PMs). The resource management server includes a non-transient computer readable medium and a processor to execute computer executable instructions stored on the non-transient computer readable medium, so that when the instructions are executed, the resource management server performs the method of: (a) obtaining a total resource demand for each dimension requested by the plurality of unassigned VMs; (b) activating at least one PM in the plurality of PMs to create a set of activated PMs; (c) assigning at least one unassigned VM to the set of activated PMs, wherein a VM assigned to a PM has an equal or lower resource demand for each dimension compared to a remaining resource capacity for each respective dimension of the PM; (d) determining whether all unassigned VMs have been assigned to a PM in the set of activated PMs; and (e) conditionally activating one or more PMs when all unassigned VMs have not been assigned to a PM in the set of activated PMs.

Another embodiment of the disclosure provides a resource management server for mapping a plurality of unassigned virtual machines (VMs) to a plurality of physical machines (PMs). The resource management server includes a non-transient computer readable medium and a processor to execute computer executable instructions stored on the non-transient computer readable medium, so that when the instructions are executed, the resource management server performs the method of: (a) obtaining a total resource demand for each dimension requested by the plurality of unassigned VMs; (b) activating at least one PM in the plurality of PMs to create a set of activated PMs; (c) assigning at least one unassigned VM to the set of activated PMs, wherein a VM assigned to a PM has an equal or lower resource demand for each dimension compared to a remaining resource capacity for each respective dimension of the PM; (d) determining whether all unassigned VMs have been assigned to a PM in the set of activated PMs; and (e) conditionally activating one or more PMs when all unassigned VMs have not been assigned to a PM in the set of activated PMs.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The resources in a data center are oftentimes overprovisioned, thus making the need to design an efficient resource management mechanism to accommodate the dynamics of application resource demands critical. The resource management mechanism may comprise two parts: (1) First, estimating the minimum resource demands (that is, determining the number of virtual machines and the size of each virtual machine) for each application running in a data center; (2) Second, virtual machine placement, that is, mapping the minimum resource demands into physical machines (PMs) so that the average resource utilization among PMs is efficient.

Figure 1:
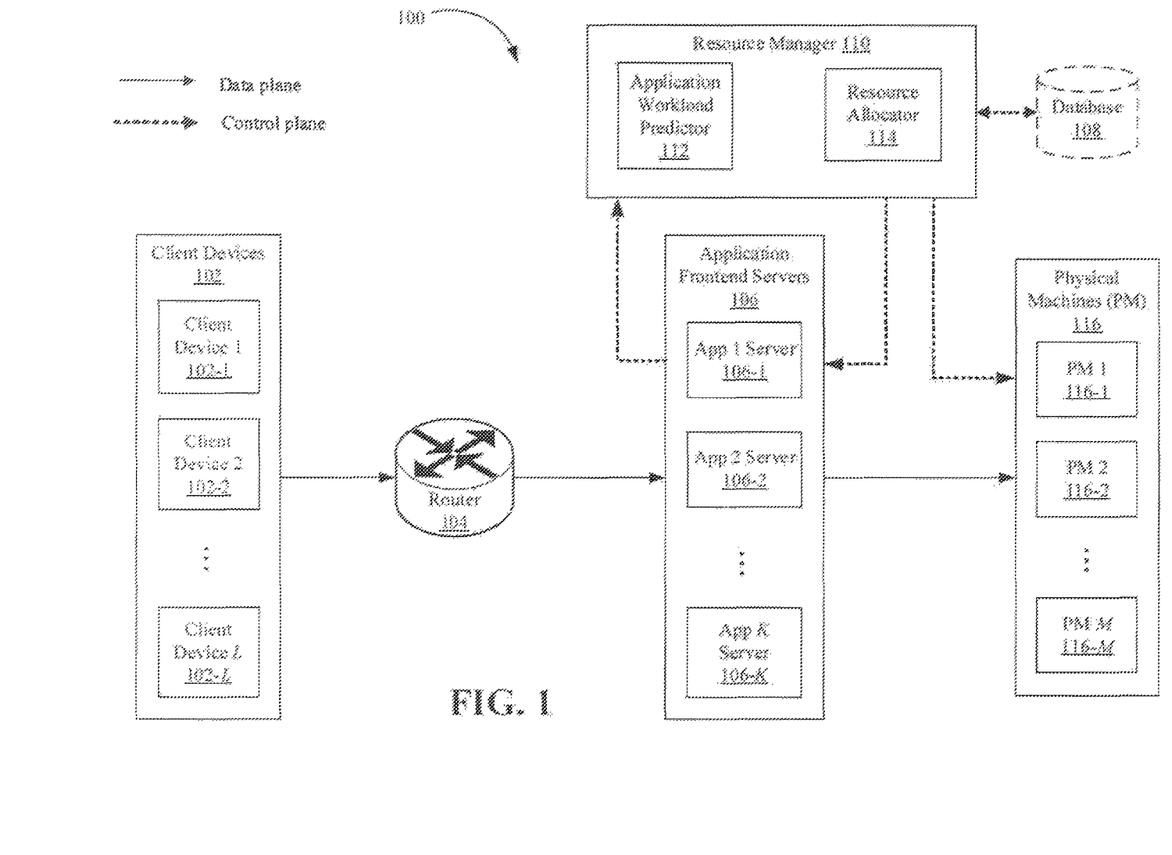
FIG. 1 illustrates an architecture for resource management in a data center according to an embodiment of the disclosure.

FIG. 1 depicts a system architecture 100 for resource management in a data center according to an embodiment of the disclosure. The system architecture 100 includes at least one client device 102, router 104, at least one application frontend server 106, database 108, resource manager 110, and at least one server or physical machine 116. The client devices 102 may include one or more laptop computers, desktop computers, smartphones, personal digital assistant (PDA), etc. The client devices 102 may be operated by multiple users using a variety of applications. For example, client device 1 102-1 may have two users running two applications, and client device 2 102-2 may have one user running three applications. Each client device 102 in FIG. 1 is able to serve a request to run at least one application in the list of applications including App 1, App 2, . . . App K. Although client device 102 is shown as a list of devices ranging from client device 1 102-1 through client device L 102-L, the system architecture 100 may be applied to a situation where only one client device, for example, client device 1 102-1, serves multiple users logged in through a remote connection.

Router 104 receives application requests from client device 1 102-1 through client device L 102-L, aggregates the application requests and routes them to the appropriate application frontend server 106. For example, client device 1 102-1 requests to run App 1 and App 2. Router 104 will process the incoming request and channel the request to run App 1 and App 2 to App 1 Server 106-1 and App 2 Server 106-2, respectively. Router 104 may be a (CORE router, for example, the gateway of the network, in the data center.

Application frontend servers 106 are computing devices that receive application requests from router 104. App 1 server 106-1 through App K server 106-K keep track of the number of application arrival requests for its respective application. Thus, App 2 server 106-2 keeps track of the number of application arrival requests for App 2 coming from client device 1 102-1 through client device L 102-L. Application frontend servers 106 provide a time-series of application arrival requests, and this information may be collected for specified timeslots. Application frontend servers 106 is depicted as a collection of App 1 server 106-1 through App K server 106-K, but it is understood that one application frontend server may be set up to track the number of application requests for App 1 through App K.

There are two planes in the architecture of FIG. 1, a control plane and a data plane as indicated by the dotted lines. In the control plane, database 108 serves as storage for the resource manager 110. Database 108 connects to the resource manager 110 to store historical workload of each application. The resource manager 110 analyzes the historical workload for an application and assigns the VMs for the application associated with an application request distribution strategy, for example, round-robin. In the data plane, for each application, the application requests are aggregated to the application frontend servers 106. Then, the application frontend servers 106 distribute those application requests among its virtual machines. The application requests do not go through the resource manager 110. The resource manager 110 assigns the resources to each application and determines the application requests' distribution strategy. For example, assuming the resource manager 110 assigns two VMs to the application, and these two VMs have the same size. Then, the resource manager informs the application frontend servers 106 about the application request strategy, for example, round-robin.

Resource manager 110 is a central controller of the data center. The resource manager 110 has two functions: (a) It retrieves application workload data (including the number of application arrival requests) from each application frontend server through database 108; and (b) It determines the minimum resource provisioning to serve the application requests for each application in a next forecasting time period, where forecasting time period is a time period where a default number of resources are made available. For example, in a first time period the default number of resources made available are 10 virtual machines, and in a second time period, the default number of resources made available are 14 virtual machines. In some embodiments, resource manager 110 analyzes historical data, for example, data stored in database 108 pertaining to application workload, to forecast workloads for each application in a forecasting time period by applying, for example, an ARIMA (autoregressive integrated moving average) model. In some embodiments, the resource manager 110 determines the minimum resource provisioning for each application in the next forecasting time period by applying a strategy that dynamically adjusts the minimum resource provisioning based on the average arrival rate of application requests. In some embodiments, the length of a timeslot where the resource manager 110 collects workload data from each application frontend server 106 is different from the forecasting time period. For example, each frontend server may upload workload data traces to the database 108 every 10 seconds, and the resource manager 110 would forecast the workload in the next 10 minutes for each application. In the foregoing example, the timeslot is 10 seconds while the forecasting period is 10 minutes.

Resource manager 110 is shown to include application workload predictor 112 and resource allocator 114. Application workload predictor 112 performs the two functions identified as (a) and (b) above. The resource allocator 114 maps the minimum resource provisioning determined by the application workload predictor 112 into physical machines (PMs) 116. The minimum resource provisioning determined by the application workload predictor 112 are first provisioned in virtual machines. The virtual machines (VMs) may be selected from a catalogue of virtual machine sizes. For example, resource manager 110 may have access to multiple VMs classified under three types—a central processing unit (CPU) intensive VM, a memory intensive VM, and a network input/output (I/O) intensive VM. Resource manager 110 would then allocate the minimum provisioning to the multiple VMs, for example, choosing to use 5 CPU intensive VMs, 3 memory intensive VMs, and 1 network I/O intensive VM. After the resource allocator 114 selects the VM combination to service application requests made from client devices 102, the resource allocator 114 then maps these selected VMs to PMs 116.

Physical machines 116 include one or more PMs labeled PM 1 116-1 through PM M 116-M to serve App 1 through App K depending on application requests received at router 104. Each PM in PM 116 includes a hypervisor to create and run virtual machines according to some embodiments of the disclosure. In some embodiments, the PMs 116 may be grouped into one or more clusters, where PMs in a cluster share the same hardware configuration. For example, PM 1 116-1 and PM 3 116-3 may have 8 central processing unit (CPU) cores and 32 GB memory, and PM 2 116-2 and PM 4 116-4 may have 4 CPU cores and 64 GB memory. PM 1 and PM 3 may be assigned to a first cluster and PM 2 and PM4 may be assigned to a second cluster.

Cluster groupings highlight similarities between hardware configurations of the PMs. Cluster arrangement of PMs 116 in the system architecture 100 is described mathematically.

PMs 116 are separated into $|\mathcal{K}|$ clusters of PMs. PMs in the same cluster k ($k \in \mathcal{K}$) have the same resource configurations. The resource configurations are characterized by a $|\mathcal{R}|$-dimensional resource capacity vector $C_k$. $\mathcal{R}$ is a set of resource dimensions with each dimension corresponding to a different resource, for example, CPU, memory, hard disk, network I/O, etc. The resource capacity vector $C_k = [C_{k,1}, \ldots, C_{k,|\mathcal{R}|}]$, where $C_{k,r}$ ($r \in \mathcal{R}$) is the dimension r resource capacity for PMs in PM cluster k. The number of PMs in each cluster is finite, that is, $N_k$ is the number of PMs in cluster k.

The mathematical description above shows that data centers have heterogeneous features which manifest themselves in PM heterogeneity. Resource demands from VMs may also provide data center heterogeneity. Assume a set of VMs, denoted as $\mathcal{I}$, are to be allocated into a set of PMs. Similarly, each VM i ($i \in \mathcal{I}$) is characterized by a $|\mathcal{R}|$-dimensional resource demands vector $d_i = [d_{i,1}, \ldots, d_{i,|\mathcal{R}|}]$, where $d_{i,r}$ ($r \in \mathcal{R}$) is the resource demand in dimension r by VM i.

When allocating a set of VMs $\mathcal{I}$ to a set of PMs $\mathcal{J}$, each PM j ($j \in \mathcal{J}$) is selected from the $|\mathcal{K}|$ number of PM clusters. A binary value $x_{j,k}$ may be used to indicate when PM j is from cluster k. So when $x_{j,k} = 1$, PM j is from cluster k; and when $x_{j,k} = 0$, PM j is not from cluster k. Similarly, a binary value $y_{i,j}$ may be used to indicate when VM i is assigned to PM j. When $y_{i,j} = 1$, then VM i is assigned to PM j; and when $y_{i,j} = 0$, then VM i is not assigned to PM j. In a heterogeneous environment, the VM placement problem can thus be formulated as a minimization of the number of active PMs under various constraints. These constraints include:

(1) For each resource dimension r of a single PM, the sum of all the hosted VMs' resource demands for dimension r should not exceed the PM's resource capacity for dimension r.
(2) Every VM that is requested by the applications should be allocated into one particular PM. That is, one VM cannot be partitioned to run on two or more PMs.
(3) The selected number of PMs from the PM cluster should not exceed the capacity of the PM cluster.

Mathematically, the objective of minimizing the number of active PMs under the aforementioned constraints may be written as Eqn. 1. In Eqn. 1, constraints (1)-(3) are represented in the first three constraint expressions, respectively. The last two constraint expressions in Eqn. 1 are provided for completeness to define and describe the $x_{j,k}$ and $y_{i,j}$ variables as already done in the previous paragraph.

$$\forall j \in \mathcal{J}, \forall r \in \mathcal{R}, \sum_{i=1}^{|\mathcal{I}|} y_{i,j} d_{i,r} \leq \sum_{k=1}^{|\mathcal{K}|} x_{j,k} C_{k,r} \quad \text{(Eqn. 1)}$$

$$\forall i \in \mathcal{I}, \sum_{j=1}^{|\mathcal{J}|} y_{i,j} = 1$$

$$\underset{x_{j,k}, y_{i,j}}{\arg\min} |\mathcal{J}| \text{ s.t.}$$

$$\forall k \in \mathcal{K}, \sum_{j=1}^{|\mathcal{J}|} x_{j,k} \leq N_k$$

$$\forall i \in \mathcal{I}, \forall j \in \mathcal{J}, \quad y_{i,j} \in \{0, 1\}$$

$$\forall j \in \mathcal{J}, \forall k \in \mathcal{K}, \quad x_{j,k} \in \{0, 1\}$$

Figure 2:
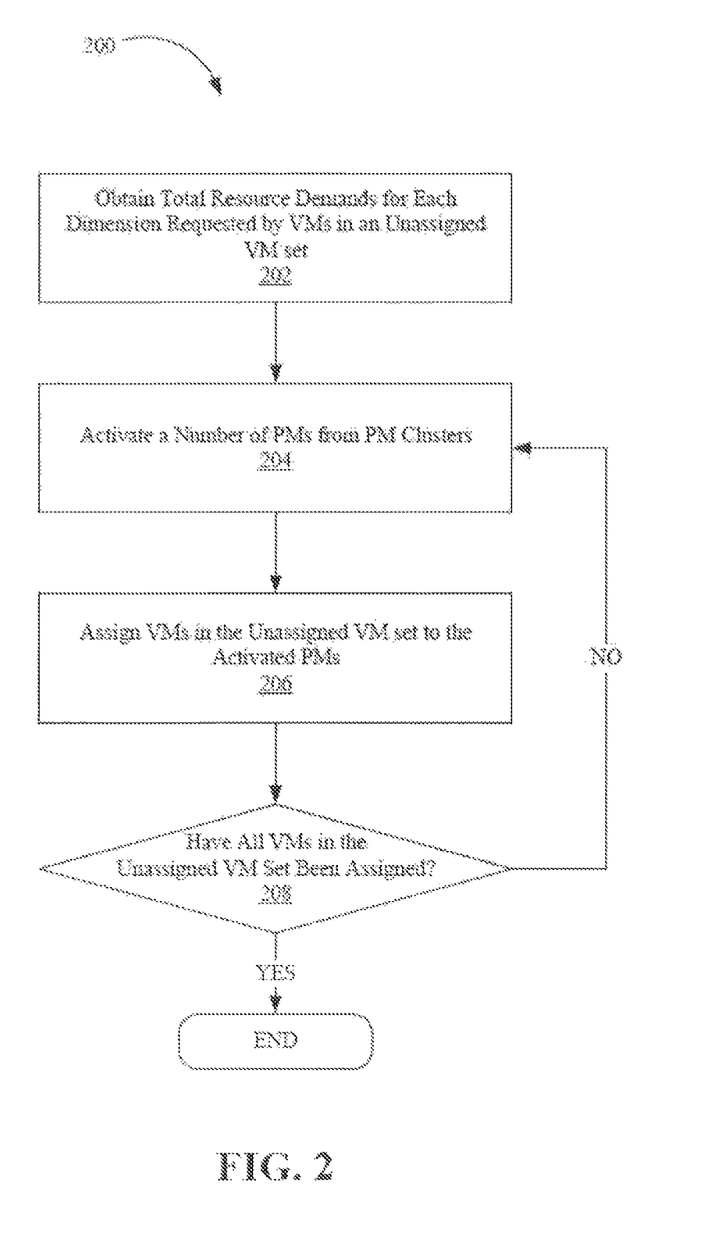
FIG. 2 illustrates a flow diagram showing a process for virtual machine placement in physical machines according to an embodiment of the disclosure.

Embodiments of the disclosure thus provide a system and method for VM placement in view of the objective and constraints. FIG. 2 illustrates a flow diagram showing a process 200 for VM placement in PMs according to an embodiment of the disclosure. Step 202 involves obtaining total resource demands for each dimension requested by VMs in an unassigned VM set. Resource allocator 114 in resource manager 110 obtains the combination of VMs to service application requests from client devices 102. The resource allocator 114 determines the combination of VMs based on the application workload predictor 112. Since these VMs are currently not running on PMs 116, they are labeled as unassigned VMs. The resource allocator 114 then computes the size of each VM as resource requests or resource demands in one or more dimensions. For example, when looking at two dimensions (CPU and memory), VM 1 may demand 0.5 units of CPU and 0.51 units of memory, VM 2 may demand 0.8 CPU and 0.52 memory, and VM 3 may demand 0.51 CPU and 0.8 memory. Normalized units of CPU and memory are used here in order to be able to compare disparate resources. For example, assume the maximum capacity of physical machines in a data center has 32 cores and 128 GB memory, then this machine may be defined to have 1 unit of CPU capacity and 1 unit of memory capacity. If another physical machine has 16 cores and 64 GB memory, then this physical machine is equated to 0.5 units of CPU and 0.5 units of memory. Other normalization techniques may be applied. The resource allocator 114 then combines the resource demands in each dimension to obtain the total resource demands in each dimension. For example, in the preceding example, the resource allocator 114 may sum up the resource demands to obtain total CPU demand from VM 1, VM 2, and VM3 as 1.81 units and total memory demand as 1.83 units.

In FIG. 2, at step 204, the resource allocator 114 activates a number of PMs from PM clusters. In some embodiments, this involves activating PMs with larger capacities to host VMs since PMs with larger capacities can host more VMs, thus minimizing the number of active PMs. In a heterogeneous environment, quantifying the capacity of a PM when considering a multi-dimensional resource capacity is difficult. For example, some PMs have higher CPU capacity but lower memory and network I/O capacity, and some PMs have higher memory capacity but lower CPU and network I/O capacity. To overcome the difficulty of quantifying the capacity of a PM in the heterogeneous environment, at step 204, PMs are activated iteratively. For example, in one embodiment, in each iteration, one PM is activated, and the number of iterations necessary to activate the number of PMs depend upon how many PMs activated are needed until the total number of PMs activated meet constraint (1). For example, available PMs may be grouped into two clusters—PM cluster 1 and PM cluster 2. PM cluster 1 may have a CPU capacity of 1.5 units and a memory capacity of 1 unit, and PM cluster 2 may have a CPU capacity of 1 unit and a memory capacity of 1.6 units. After step 204, PM combinations in PM cluster 1 and PM cluster 2 may be activated to host unassigned VMs.

At step 206, the resource allocator 114 assigns VMs in the unassigned VM set to the activated PMs. Step 206 involves allocating the unassigned VMs into active PMs obtained at step 204 without exceeding the resource capacities of the PMs. Thus, step 206 involves assigning as many VMs as possible to the active or activated PMs. In some instances, not all VMs in the unassigned VM set can be allocated in the active PMs without exceeding the resource capacities of the active PMs. So, step 206, may utilize a VM assignment priority where VMs with certain properties are assigned before VMs of other properties. In some cases, a VM that matches well with the total remaining resource capacity of the active PMs is allocated before a VM that does not. For example, if more memory resource is left in the active PMs compared to other resource dimensions, an unassigned VM with the highest memory demand is chosen to be allocated. At step 206, VMs are assigned iteratively, and in each iteration, one VM is assigned to one active PM in a specified order based on the size of the VM and how well the VM matches the total remaining resource capacity (available resources) of the active PMs. As VMs are assigned to one or more PMs, the assigned VMs are removed from the unassigned VM set. In some embodiments, the VMs in the unassigned VM set may be sorted first before assigning to the active PMs.

At step 208, the resource allocator 114 determines whether all VMs in the unassigned VM set have been assigned to a PM. As previously stated, in some instances, the activated number of PMs from the PM clusters do not have enough resources to host all VMs in the unassigned VM set. For example, an unassigned VM set contains VM 1, VM 2, and VM 3, and PM A and PM B are the activated PMs. If VM 2 and VM 3 are assigned to PM A and PM B, respectively, VM 1 may be left unassigned since neither PM A nor PM B has enough resources to host VM 1. If a VM is left unassigned after step 206, then step 204 is performed again to activate more PMs to cover the remaining VMs in the unassigned VM set. If all VMs in the unassigned VM set have been assigned, then the VM placement process 200 is completed.

Figure 3:
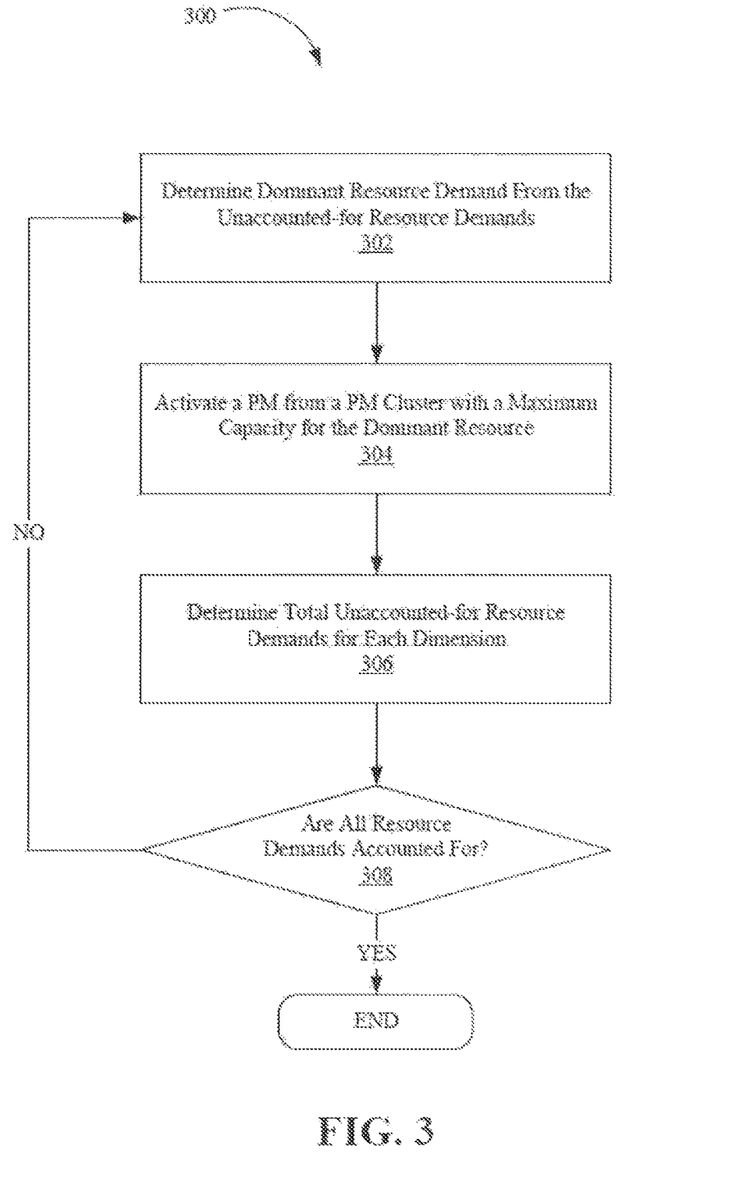
FIG. 3 illustrates a flow diagram showing activation of physical machines from physical machine (PM) clusters according to an embodiment of the disclosure.

FIG. 3 illustrates a flow diagram showing a process 300 of activating physical machines in PM clusters according to an embodiment of the disclosure. The process 300 is a detailed view of steps involved in step 204 of FIG. 2 according to some embodiments. At step 302, the resource allocator 114 determines the dominant resource demand from unaccounted-for resource demands. The dominant resource demand is defined as a quantity of a dimension that is greater than or equal to quantities of other dimensions. Unaccounted-for resource demands are resource demands that exceed total available resources of activated or active PMs. For example, at the start of the activation process, the total unaccounted-for resource demands for each dimension for VMs in an unassigned VM set is equal to 1.81 units of CPU and 1.83 units of memory. Thus, the dominant resource in this example is memory since 1.83 is greater than 1.81.

At step 304, the resource allocator 114 activates a PM from a PM cluster with a maximum capacity for the dominant resource. For example, if memory is identified as the dominant resource since 1.83 is greater than 1.81, and PM cluster 2 has a memory capacity of 1.6 units while PM cluster 1 has a memory capacity of 1 unit, then applying step 304 to the example, a physical machine from PM cluster 2 is activated.

The simple example illustrated shows a one-step comparison since only two dimensions or types of resources are being compared. In some embodiments with more than two dimensions, more than one comparison may be made to determine which PM to activate in which PM cluster. For example, if total unaccounted-for resource demands for {CPU, memory, network I/O} were {1, 1.8, 1.2}, then an order of most requested resource would be memory, then network I/O, then CPU. Memory would be the dominant resource since the quantity of memory units exceeds the other two. If {CPU, memory, network I/O} were {1, 2, 0.5} and {0.5, 2, 0.5} for PM cluster X and PM cluster Y, respectively, then when trying to determine which PM from which cluster to activate, the memory capacity for PM cluster X would be compared with that of PM cluster Y. Both have memory capacity of 2, so the next dominant resource from the order of most resource is checked, that is, network I/O. Network I/O capacity for both clusters is 0.5, so the last resource is checked. CPU capacity for PM cluster X is greater than the CPU capacity for PM cluster Y, so a PM in PM cluster X is activated.

At step 306, the resource allocator 114 determines total unaccounted-for resource demands for each dimension. After activating a PM, the resource capacity in each dimension for that PM is subtracted from the previous total unaccounted-for resource demands for each dimension. In some embodiments, the resource allocator 114 determines total unaccounted-for resource demands in each dimension by summing up resource demands in each dimension form the unassigned VMs to obtain a total resource demand for each dimension. The resource allocator 114 then sums up the resource capacity in each dimension of the PMs in the set of activated PMs to obtain total resource capacity in each dimension of the set of activated PMs. The total unaccounted-for resource demands for each dimension is then a subtraction of the total resource capacity in each dimension from the total resource demands in each dimension.

At step 308, the resource allocator 114 determines whether all resource demands have been accounted for. This step involves checking to see whether the newly determined total unaccounted-for resource demand is greater than zero in any dimension. If any dimension of the total unaccounted-for resource demand is greater than zero, then step 302 is performed with the total unaccounted-for resource demand obtained at step 306. If all resource demands have been accounted for, then the PM activation process 300 is completed. It is understood that checking whether the total unaccounted-for resource demand is less than zero may be performed to determine whether or not to end the PM activation process 300.

Mathematically, steps 302 and 304 may be described as determining an order or ranking of the resource dimensions based on the total unaccounted-for resource demands and using this order to compare resource dimensions in PM clusters to determine which PM to activate. Let $\mathcal{J}'$ be the set of PMs which have been activated then the unaccounted-for resource demand vector $\mathcal{G}$ may be defined as $\mathcal{G}=\{g_1, g_2, \ldots, g_{|\mathcal{R}|}\}$, where $g_r$ ($1 \leq r \leq |\mathcal{R}|$) is the residual or total unaccounted-for resource demand in dimension r. The residual or unaccounted-for resource demand is the difference between the total resource demand in dimension r from the VMs and the total resource capacity in dimension r from the active PMs. So $g_r$ may be written as Eqn. 2.

$$g_r = \sum_{i=1}^{|I|} \sum_{j=1}^{|\mathcal{J}|} y_{i,j}^* d_{i,r} - \sum_{i=1}^{|I|} \sum_{j=1}^{|\mathcal{J}'|} x_{j,k} C_{k,r} \qquad \text{(Eqn. 2)}$$

Let $\tau_1$ be the $1^{st}$ order dominant resource demand among all dimensions of unaccounted-for or residual resource demands, that is, $g_{\tau_1}=\max\{g_1, g_2, \ldots, g_{|\mathcal{R}|}\}$, where $\tau_1 \in \mathcal{R}$. Let $\tau_2$ be the $2^{nd}$ order dominant resource demand among all dimensions of residual resource demands, that is, $g_{\tau_2}=\max\{\{g_1, g_2, \ldots, g_{|\mathcal{R}|}\}\backslash g_{\tau_1}\}$, where $\tau_2 \in \mathcal{R}$. Similarly, let $\tau_n$ be the $n^{th}$ order dominant resource demand among all dimensions of residual resource demands, that is, $g_{\tau_n}=\max\{\{g_1, g_2, \ldots, g_{|\mathcal{R}|}\}\backslash\{g_{\tau_1}, g_{\tau_2}, \ldots, g_{\tau_{n-1}}\}\}$, where $\tau_n \in \mathcal{R}$. Thus, a dominant resource demand vector T may be defined as $T=\{\tau_1, \tau_2, \ldots, \tau_{|\mathcal{R}|}\}$ where $\tau_1, \tau_2, \ldots, \tau_{|\mathcal{R}|}$ is the order or ranking of the resource dimensions based on the unaccounted-for resource demands. This order is determined at step 302 with dominant resource being dimension $\tau_1$.

A PM cluster with the maximum capacity is determined by first finding the PM cluster with the maximum resource capacity for dimension $\tau_1$. If there is only one PM cluster that has the maximum resource capacity for dimension $\tau_1$, this PM cluster has the maximum capacity in the PM cluster set $\mathcal{K}$. If more than one PM cluster has the same maximum resource capacity for dimension $\tau_1$, the set of these PM clusters is denoted as $\mathcal{K}_1$, and then the next step is to find the PM cluster(s) with the maximum resource capacity for dimension $\tau_2$ in $\mathcal{K}_1$. The process is repeated, that is, finding the PM cluster(s) with the maximum resource capacity for dimension $\tau_n$ in the PM cluster set $\mathcal{K}_{n-1}$ ($1 \leq n \leq |\mathcal{R}|$), iteratively until there is only one PM cluster left in the PM cluster set, then this PM cluster has the maximum capacity among PM clusters. Note that in each iteration, one PM is activated from the available PM cluster which has at least one PM with the maximum capacity. Also note that the dominant resource demand vector T changes in each iteration, so the PM cluster with the maximum capacity changes accordingly. After PM activation, VMs are assigned to the active PMs.

Figure 4:
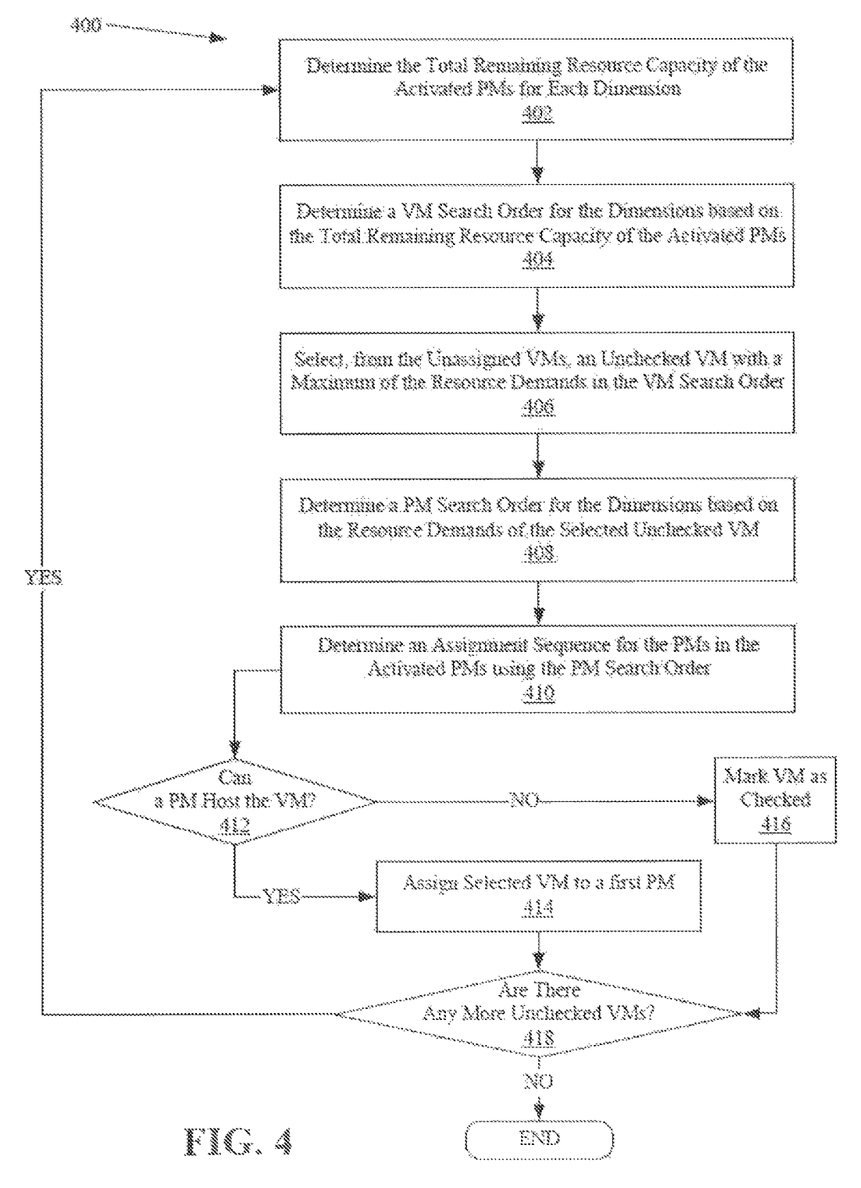
FIG. 4 illustrates a flow diagram showing how to assign VMs in an unassigned VM set to activated PMs.

FIG. 4 illustrates a flow diagram showing a VM assignment process 400 for assigning VMs in an unassigned VM set to activated PMs according to an embodiment of the disclosure. VM assignment process 400 is a detailed embodiment of step 206 in FIG. 2. At step 402, the resource allocator 114 determines the total remaining resource capacity of the activated PMs for each dimension. For example, in FIG. 5C, PM A and PM B are activated. PM A and PM B have {CPU, memory} resource capacities of {1.5, 1} and {1, 1.6}, respectively, thus, their total remaining resource capacity is {2.5, 2.6}.

At step 404, a VM search order or ranking for the different dimensions is determined by the resource allocator 114 based on the total remaining resource capacities of the activated PMs. The first dimension of the VM search order or ranking is a dominant total remaining resource. For example, if total remaining resource capacity for (CPIU, memory, network I/O) for a group of activated PMs were {1.5, 2, 1.2}, then the VM search order for the dimensions based on the total remaining resource capacities would be memory, then CPU, then network I/O. For the example in FIG. 5C, since the total remaining resource capacity is {2.5, 2.6} for {CPU, memory}, the VM search order for the dimensions is memory, then CPU.

At step 406, the resource allocator selects from the unassigned VMs an unchecked VM with a maximum of the resource demands in the VM search order for the dimensions. The VM assignment process 400 is iterative, and thus an unchecked VM is a VM that has not been selected at step 406 in a previous iteration of the VM assignment process 400. Another way of stating this is that an unchecked VM is a VM where an attempt has not been made to match the VM to a PM in the current activated PM set. Step 406 is analogous to step 304 except that in step 304, a PM was being activated, but in step 406 a VM is being selected for assignment. The unchecked VM(s) with the maximum resource demand in the first dimension of the VM search order is selected. If more than one VM fits this criteria, then within the VMs fitting this criteria, the VM(s) with the maximum resource demand in the second dimension is selected. If more than one VM fits this second criteria, then the process continues in the VM search order of the dimensions until only one VM is selected.

At step 408, the resource allocator 114 determines a PM search order or ranking for the different dimensions based on the resource demands of the selected unchecked VM. The first dimension of the PM search order or ranking is a dominant resource for the selected unchecked VM. For example, if the selected unchecked VM has resource demands for {CPU, memory, network I/O} of {1, 0.5, 0.8}, then the PM search order for the dimensions based on the resource demands of the selected unchecked VM is CPU, then network I/O, then memory.

At step 410, the resource allocator 114 determines an assignment sequence for the PMs in the activated PMs using the PM search order. The assignment sequence for the PMs is an order to attempt assignments of the selected VM to a PM. The assignment sequence is determined by ranking the activated PMs in order of the remaining resource capacity in the PM search order. The PM(s) with the maximum remaining resource capacity in the first dimension of the PM search order is selected. If more than one PM fits this criteria, then within the PMs fitting this criteria, the PM(s) with the maximum remaining resource capacity in the second dimension is selected. If more than one PM fits this second criteria, then the process continues in the PM search order of the dimensions until only one PM is selected. The selected PM is the first PM in the assignment sequence. The ranking process is performed with the remaining active PM(s) until a sequence or priority is obtained.

At step 412, the resource allocator 114 determines whether a PM can host the selected VM. A PM is able to host a selected VM when resource demands in each dimension of the selected VM is less than the remaining resource capacity in each respective dimension of the PM. For example, if a selected VM has resource demands for {CPU, memory} of {0.8, 1.2} and a PM has a remaining resource capacity of {0.7, 1.4}, then the PM is unable to host the selected VM. If a second PM next on the assignment sequence has remaining resource capacity for {CPU, memory} of {0.9, 1.3}, then the second PM's remaining resource capacity will be compared against the selected VM's remaining resource demands. This second PM has enough remaining resource capacity to host the selected VM.

If after going through the activated PMs in the order prescribed by the assignment sequence and no PM can be found that can host the selected VM, then the selected VM is marked as checked at step 416.

While going through the activated PMs in the order prescribed by the assignment sequence, if a PM is identified as capable of hosting the selected VM, at step 414, the selected VM is assigned to the first PM that fits this criteria.

At step 418, the resource allocator 114 determines whether there are any more unchecked VMs in the unassigned VM set. If all unassigned VMs have either been checked or assigned to a PM, then the VM assignment process 400 ends. Otherwise, the VM assignment process 400 moves to step 402.

The VM assignment process 400 may be described mathematically. Steps 402 and 404 involve determining the total remaining resource capacity of the activated PMs and determining a VM search order for the resource dimensions based on the total remaining resource capacity. Let $\mathcal{J}'$ be the set of PMs which have been activated and $\mathcal{I}^*$ ($\mathcal{I}^* = \mathcal{I} - \mathcal{I}'$) be the set of VMs which have already been allocated to the active PMs. Then a total remaining resource capacity vector $\mathcal{H}$ may be defined as $\mathcal{H} = \{h_1, h_2, \ldots, h_{|\mathcal{R}|}\}$, where $h_r$ ($1 \leq r \leq |\mathcal{R}|$) is the total remaining resource capacity for dimension r in the set of PMs $\mathcal{J}'$ and may be expressed as Eqn. 3.

$$h_r = \sum_{j=1}^{|\mathcal{J}'|} x_{j,k} C_{k,r} - \sum_{i=1}^{|T^*|} d_{i,r} \quad \text{(Eqn. 3)}$$

By determining the total remaining resource capacity vector $\mathcal{H}$, a dominant resource capacity vector $w$ may be defined as follows: let $w_1$ be the first order dominant resource capacity among all dimensions of residual resource capacity, that is, $h_{w_1} = \max\{h_1, h_2, \ldots, h_{|\mathcal{R}|}\}$; let $w_2$ be the second order dominant resource capacity among all dimensions of residual resource capacity, that is, $h_{w_2} = \max\{\{h_1, h_2, \ldots, h_{|\mathcal{R}|}\} \backslash h_{w_1}\}$; similarly, let $w_n$ be the $n^{th}$ order dominant resource capacity among all dimensions of residual resource capacity, that is, $h_{w_n} = \max\{\{h_1, h_2, \ldots, h_{|\mathcal{R}|}\} \backslash \{h_{w_1}, h_{w_2}, \ldots, h_{w_{n-1}}\}\}$. Then $w = \{w_1, w_2, \ldots, w_{|\mathcal{R}|}\}$. The $w_1, w_2, \ldots, w_{|\mathcal{R}|}$ order is defined as the VM search order.

At step 406, VMs are compared to select a VM with the maximum of the resource demands in the VM search order. That is, suppose there are two VMs: VM A and VM B. The resource demands in each dimension for the two VMs is compared iteratively based on the VM search order provided in resource capacity vectors $w$. Specifically, resource demands for dimension $w_1$ (denoted as $d_{A,w1}$ and $d_{B,w1}$) are compared. If $d_{A,w1} > d_{B,w1}$, then VM A is selected over VM B. If $d_{A,w1} < d_{B,w1}$, then VM B is selected over VM A. If $d_{A,w1} = d_{B,w1}$, then the resource demands of the two VMs for dimension $w_2$ is compared. The iteration continues until $d_{A,w_n} \neq d_{B,w_n}$, or all resource dimensions have been traversed. Based on the comparison rule, a VM from the unassigned VM set is selected.

At step 408, a PM search order for the dimensions is determined based on the selected VM in the previous step. Let VM i be the selected VM from the unassigned VM set, then the resource demand vector for VM i may be defined as $d_i$ ($d_i = \{d_{i,1}, d_{i,2}, \ldots, d_{i,|\mathcal{R}|}\}$). Then, $T_i' = \{\tau_1', \tau_2', \ldots, \tau_{|\mathcal{R}|}'\}$ is the dominant resource demand for VM i. That is, $d_{\tau_1'} = \max\{d_1, d_2, \ldots, d_{|\mathcal{R}|}\}$ and $\tau_n'$ ($2 \le n \le |\mathcal{R}|$) is the $n^{th}$ order dominant resource demand among all dimensions of resource demands for VM i, that is, $d_{\tau_n'} = \max\{\{d_1, d_2, \ldots, d_{|\mathcal{R}|}\} \backslash \{d_{\tau_1'}, d_{\tau_2'}, \ldots, d_{\tau_{n-1}'}\}\}$. The residual or unallocated capacities of two PMs may be compared based on the dominant resource demand vector $T_i'$. That is, $\tau_1', \tau_2', \ldots, \tau_{|\mathcal{R}|}'$ specifies the PM search order for the dimensions.

Steps 410, 412, and 414 involve mapping the selected VM to a first PM in an assignment order. The VM assignment process 400 balances the unallocated or remaining resource capacity among active PMs by assigning a VM with the largest resource demands for dimension r among all dimensions to a PM with the largest unallocated or remaining resource capacity for dimension r among active PMs. Specifically, let $\mathcal{V}_j$ ($\mathcal{V}_j = \{v_{j,1}, v_{j,2}, \ldots, v_{j,|\mathcal{R}|}\}$) be the remaining resource capacity vector for PM j, where $v_{j,r} = \sum_{j=1}^{|\mathcal{J}'|} x_{j,k} C_{k,r} - \sum_{i=1}^{|T^*|} y^*_{i,j} d_{i,r}$ ($1 \le r \le |\mathcal{R}|$). The assignment order is determined by comparing the remaining resource capacities of the activated PMs using the PM search order. Suppose two PMs, PM A and PM B, are to be compared, their unallocated resource capacity for each dimension is compared iteratively based on the order of $T_i'$. Specifically, the unallocated resource capacities for dimension $\tau_1'$, denoted as $v_{A,\tau_1'}$ and $v_{B,\tau_1'}$, are first compared. If $v_{A,\tau_1'} > v_{B,\tau_1'}$, PM A has a larger residual resource capacity than PM B. If $v_{A,\tau_1'} < v_{B,\tau_1'}$, PM B has a larger residual resource capacity compared to PM A. If $v_{A,\tau_1'} = v_{B,\tau_1'}$, then the residual resource capacity for dimension $\tau_2'$ of the two PMs is compared against each other using the previously defined rule. The iteration continues until $v_{A,\tau_q'} \neq v_{B,\tau_n'}$, or all resource dimensions have been traversed. In the case that two or more PMs have the same residual resource capacity, then the two or more PMs may be sorted randomly. Using the comparison, the active PMs in $\mathcal{J}'$ may be arranged and sorted in a non-increasing order of the residual resource capacity.

An attempt is then made to assign VM i to the first PM that can host VM i. That is for every dimension, the residual resource capacity of the first PM is greater than or equal to the resource demands of VM i. At step 416, if VM i cannot be assigned to any of the active PMs, then the VM is set aside and another VM is selected or the process is completed.

Figure 5A:
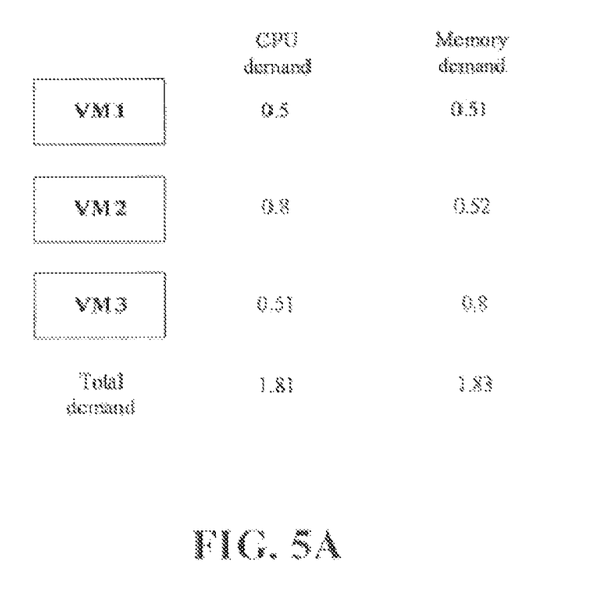
FIG. 5A illustrates an example of unassigned VMs and their unit demands of central processing unit (CPU) and memory resources according to an embodiment of the disclosure.
Figure 5B:
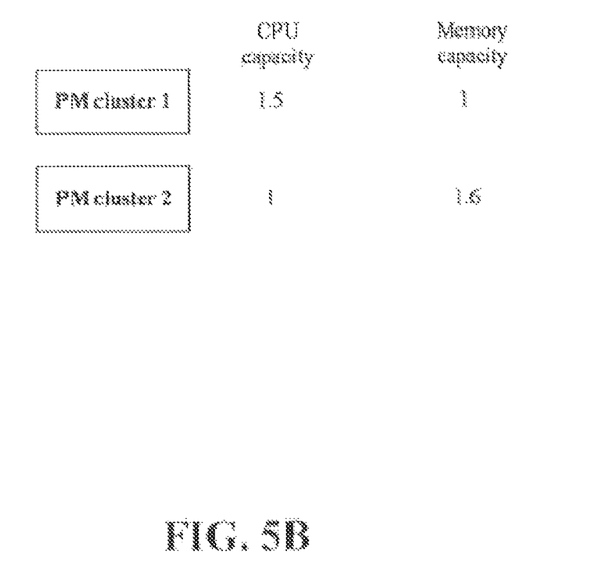
FIG. 5B illustrates a concept of physical machine clustering according to an embodiment of the disclosure.

FIGS. 5A-D illustrate an example showing the allocation process of three VMs to PMs. Suppose there are three VMs, denoted as VM1, VM2, and VM3, that are required to be allocated as described in FIG. 5A. VM 1 has units of resource demands for {CPU, memory} as {0.5, 0.51}, VM 2 has {0.8, 0.52} units of resource demands, and VM 3 has {0.51, 0.8} units of resource demands. Note that "resource demands" and "resource requests" are used interchangeably. FIG. 5B shows that there are two PM clusters with physical machines in the data center. The two PM clusters are labeled as PM cluster 1 and PM cluster 2. PM cluster 1 has a CPU capacity of 1.5 units and a memory capacity of 1 unit, and PM cluster 2 has a CPU capacity of 1 unit and a memory capacity of 1.6 units.

Referring to FIG. 2, step 202 involves obtaining total resource demands for each dimension requested by VMs in an unassigned VM set. The unassigned VM set for FIG. 5A includes VM 1, VM 2, and VM 3. The total resource demands for each dimension is determined to be {1.81, 1.83} units of {CPU, memory} as shown in FIG. 5A. Each of these values is obtained by summing up the CPU and memory demands of VM 1, VM 2, and VM 3.

At step 204, a number of PMs are activated from the PM cluster 1 and PM cluster 2. Step 204 may be accomplished using the PM activation process 300 of FIG. 3. Step 302 involves determining the dominant resource demand from the unaccounted-for resource demands. Currently, {CPU, memory} resource demands of {1.81, 1.83} are unaccounted-for. Since 1.83>1.81, memory is determined to be the dominant resource then followed by CPU. Then, at step 302, a PM from a PM cluster with a maximum capacity for the dominant resource is activated. Thus, a PM from PM cluster 2 is activated since PM cluster 2 has a memory capacity of 1.6 units compared to the 1 unit memory capacity of PM cluster 1.

After activating a PM from PM cluster 2, step 306 involves determining total unaccounted-for resource demands for each dimension. This step involves subtracting the resource capacity of the activated PM from the previous total unaccounted-for resource demands. That is the operation of {1.81, 1.83}-{1, 1.6} is performed to obtain total unaccounted-for resource demands of {0.81, 0.23} for {CPU, memory}. Step 308 involves determining whether all resource demands are accounted for. Since {0.81, 0.23}≤{0, 0} evaluates to {false, false}, all resource demands have not been accounted for.

Figure 5C:
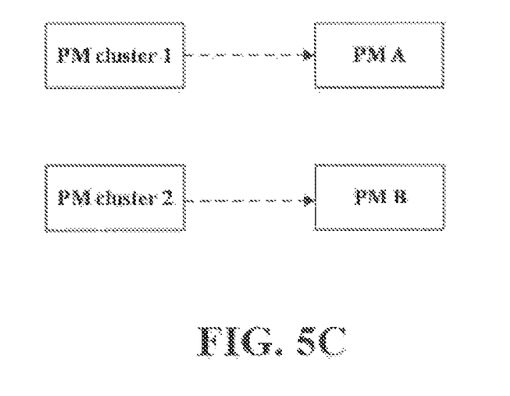
FIG. 5C illustrates selecting physical machines from physical machine clusters according to an embodiment of the disclosure.

Step 302 is then performed on the {0.81, 0.23} units of {CPU, memory} resource demands. CPU is determined to be the dominant resource demand since 0.81>0.23. At step 304, a PM from PM cluster 1 is activated since PM cluster 1 has a CPU capacity of 1.5 units which is greater than the 1 unit CPU capacity of PM cluster 2. Step 306 then involves determining new total unaccounted-for resource demands for each dimension. The operation of {0.81, 0.23}-{1.5, 1} is performed to obtain total unaccounted-for resource demands of {−0.69, −0.77} for {CPU, memory}. At step 308, since {−0.69, −0.77}≤{0, 0} evaluates to {true, true}, all resource demands have been accounted for. FIG. 5C shows that two PMs have been activated through the PM activation process 300 after performing step 204 of FIG. 2. PM A is a PM activated from PM cluster 1 and PM B is a PM activated from PM cluster 2.

Once the PMs have been activated at step 204, step 206 involves assigning VMs in the unassigned VM set to the activated PMs. Assigning VMs to PMs involves allocating as many VMs in the unassigned VM set as possible into the activated PMs. The assigning process involves first selecting a suitable VM and placing the VM into a suitable PM. The assigning process then continues by selecting another suitable VM and placing it into a suitable PM until all the VMs are placed into the PMs or none of the PMs can host the rest of the VMs. An embodiment of this process is provided in provided in FIG. 4. At step 401, the total remaining resource capacity of the activated PMs is determined for each dimension. Since PM A and PM B are activated, their total remaining resource capacity is {2.5, 2.6} for {CPU, memory} capacity.

At step 404, a VM search order for the dimensions based on the total remaining resource capacity of the activated PMs is determined. Since 2.6>2.5, then memory is determined to be the dominant resource capacity then CPU. At step 406, VM 3 is selected as the first VM to assign to an activated PM since VM 3 has the maximum memory demand in comparison to VM 1 and VM 2. That is 0.8>0.52>0.51. At step 408, a PM search order for the dimensions based on the resource demands of VM 3 is determined. VM 3 requests {0.51, 0.8} units of {CPU, memory}, and since 0.8>0.51, memory is the dominant resource requested then CPU. Since PM B has more remaining memory resources than PM A, PM B is selected to host VM 3. The assignment order is PM B then PM A. Note that PM B has enough CPU resources to host VM 3 as well so the search stopped at PM B, therefore, the remaining resource capacity of PM A was not compared to the resource requests of VM 3 to determine whether PM A can host VM 3.

At step 418, since VM 2 and VM 1 have not been assigned, step 402 is performed again. The assignment of VM 3 to PM B reduces the total remaining resource capacity of the activated PMs. PM B now has remaining capacity of {0.49, 0.8} units of {CPU, memory}. Thus the total remaining resource capacity of the activated PMs is {1.99, 1.8} units of {CPU, memory}. At step 404, the VM search order is determined to be CPU then memory since 1.99>1.8. At step 406, VM 2 is selected to be assigned since VM 2 has a CPU demand of 0.8 compared to the 0.5 CPU demand of VM 1. At step 408, a PM search order for the dimensions based on the resource demands of VM 2 is determined. Since PM A has 1.5 units of remaining CPU capacity compared to the 0.49 units of remaining CPU capacity of PM B, PM A is prioritized for assignment over PM B. PM A is selected to host VM 2. Since VM 1 is still unallocated, the process is repeated.

Figure 5D:
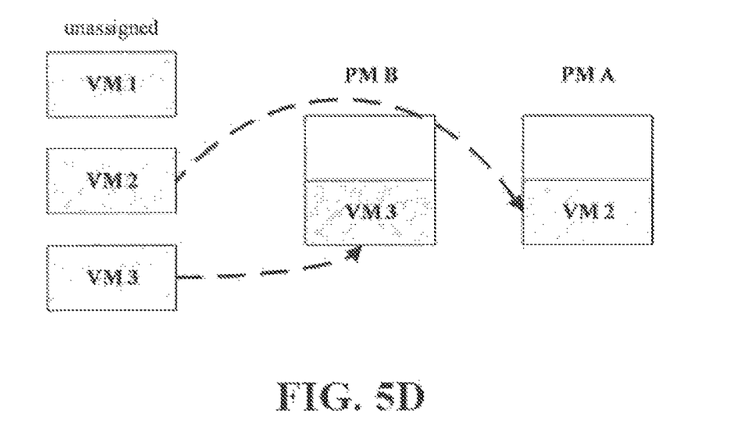
FIG. 5D illustrates assigning VMs to physical machines according to an embodiment of the disclosure.

At step 402, the total remaining resource capacity is determined to be {1.19, 1.28} units of {CPU, memory}. The VM search order is determined to be memory then CPU, but since only VM 1 remains unassigned, VM 1 is selected for assignment. A PM search order based on the resource demands of VM 1 show that PM B with a remaining capacity of {0.49, 0.8} units is prioritized over PM A with a remaining capacity of {0.7, 0.48} units. Neither PM A nor PM B can host VM 1 since VM 1 memory demands exceed the remaining memory capacity of PM A and VM 1 CPU demands exceed the remaining CPU capacity of PM B. VM 1 is marked as checked at step 416. At step 418, since there are no more unchecked VMs, the VM assignment process 400 is completed. FIG. 5D shows the state of VM assignment after VM 2 and VM 3 have been assigned and VM 1 has failed to be assigned.

Once the VMs have been assigned at step 206, step 208 involves checking whether all VMs in the unassigned VM set have been assigned. In this case, since VM 1 is unassigned, step 204 is performed to activate a number of PMs in order to assign VM 1 to a PM. When activating the number of PMs, the already activated PMs are not taken into account since these already activated PMs were determined to not be able to host the unassigned VMs. Therefore, unaccounted-for resource demands will be the resource demands of VM 1, and a PM will be activated to meet these demands. In some embodiments, after step 204, then step 206 is performed considering only the newly activated PMs since the previously activated PMs were determined to not be able to host the unassigned VMs. In this example, if a PM C is activated to host VM 1, then at step 206, VM 1 will be assigned to PM C considering only resource requirements from PM C and not those from PM A and PM B.

Figure 6:
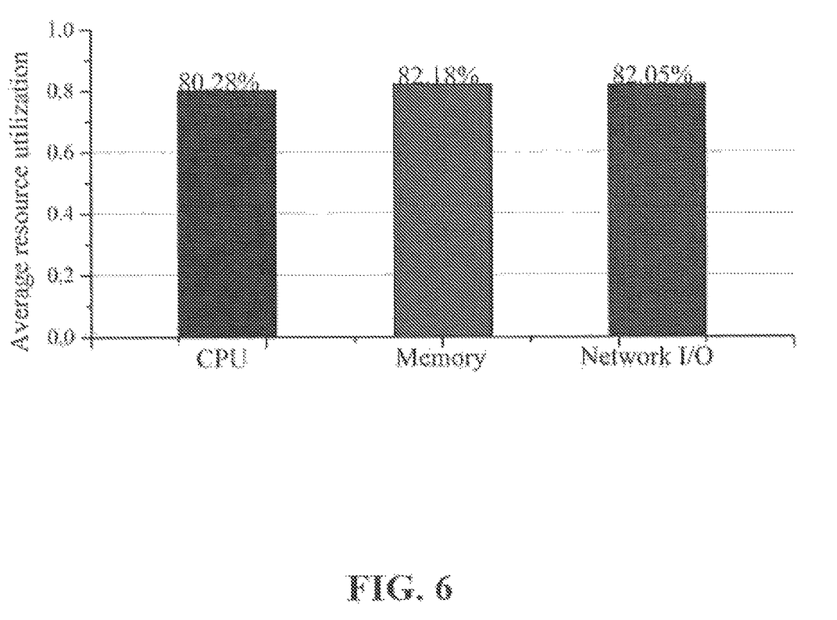
FIG. 6 illustrates average resource utilization across three dimensions in a data center using some embodiments of the disclosure.

FIG. 6 shows that CPU, memory, and network I/O resource utilizations are high in a data center utilizing some embodiments of the disclosure. To obtain FIG. 6, a simulation environment was set up as follows: there are three applications running in the data center, namely, App-1, App-2 and App-3. App-1 is a CPU intensive application, that is, CPU resource is the main factor in determining its performance, and App-2 and App-3 are the memory intensive and network I/O intensive applications, respectively. Resource configurations of the data center include: 6 different types of PM clusters in the data center, and 12 types of VM pools for the three applications. VMs in VM pool 1-4 are designed for CPU intensive applications, the VMs in VM pool 5-8 are designed for memory intensive applications, and the VMs in VM pool 9-12 are designed for network I/O intensive applications.

The resource manager 110 first predicts the arrival rate of each application sequentially. Specifically, for each 10 seconds, the front-end servers of different applications send the application workloads in terms of number of application requests within that period to the resource manager 110. The resource manager 110 continuously collects the application workloads data trace and applies a prediction model through application workload predictor 112 to forecast the application workloads in the next 10 minutes. The prediction algorithm runs every 10 minutes. Furthermore, the average prediction error of the three types of application workloads are calculated as 14.33% (App-1), 6.89% (App-2) and 8.15% (App3), respectively.

After acquiring the predicted application workloads for three applications, the resource allocator 114 starts to assign the minimum VM resources and map the VMs into the minimum number of PMs using some embodiments of the disclosure. Average CPU, memory and network I/O among active PMs in each time slot during the day is obtained. Thus, the average CPU, memory and network I/O utilization time series remain stable even if the application workloads dynamically vary over time. Moreover, the calculation of the average CPU, memory and network I/O utilization among active PMs during the day imply that utilizing embodiments of the disclosure can achieve above 80% average resource utilization for all dimensions as depicted in FIG. 6.

Figure 7:
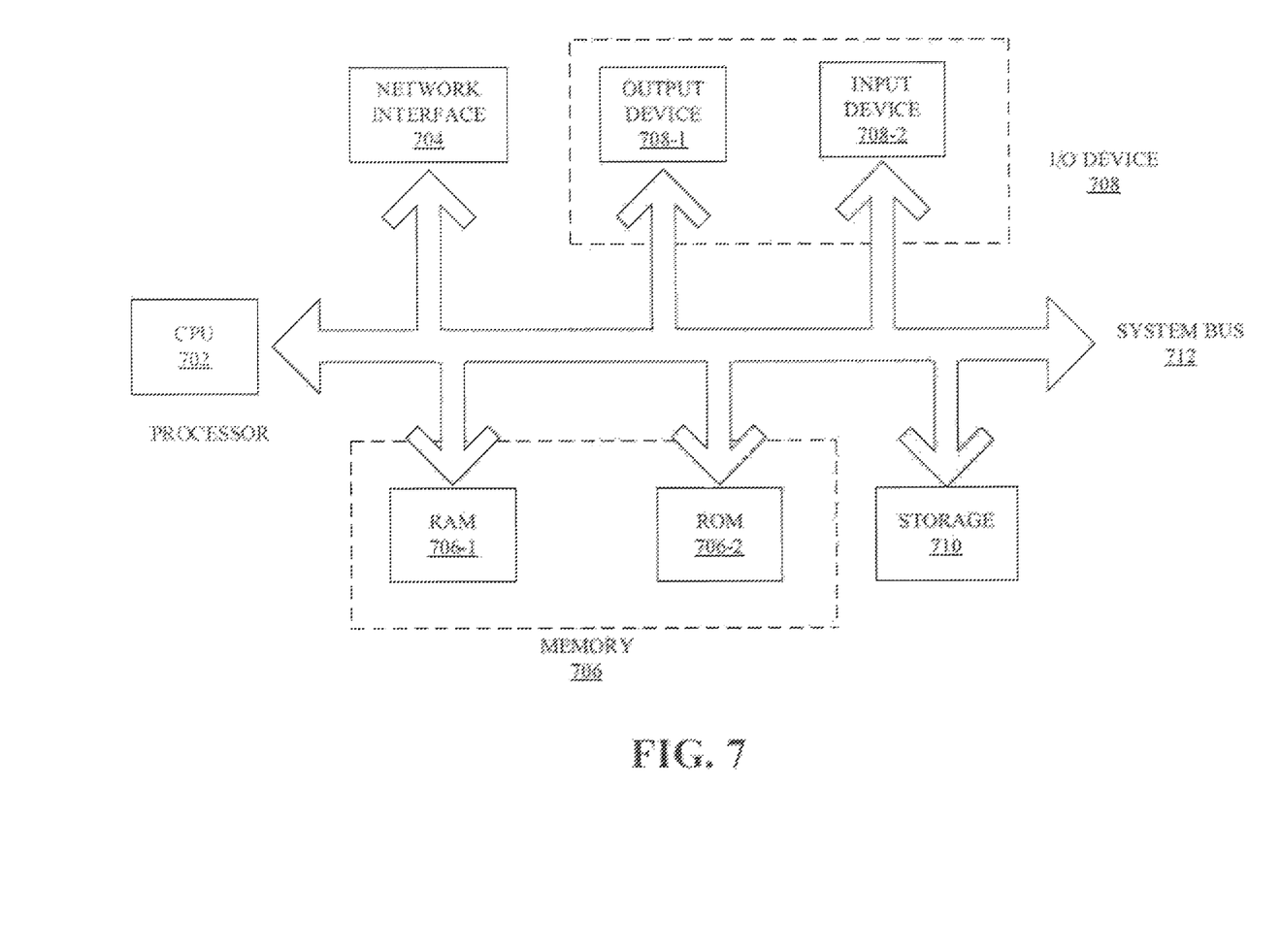
FIG. 7 illustrates an implementation of a server according to some embodiments of the disclosure.

The resource management server 110 in some embodiments of the disclosure may be implemented as a computer or server as depicted in FIG. 7. The computer includes a central processing unit (CPU) 702, a system memory 706, and a system bus 712. The system memory includes both read only memory (ROM) 706-1 and random access memory (RAM) 706-2. The ROM stores a basic input/output system (BIOS), which contains the basic routines that assist in the exchange of information between elements within the computer, for example, during start-up. The RAM stores a variety of information including an operating system, an application programs, other programs, and program data. The computer further includes a network interface 704, input/output devices 708 (including output devices 708-1 and input devices 708-2), and storage drives 710, which read from and writes to storage media, respectively. The storage media may include but is not limited to flash memory, one or more hard disks, one or more magnetic disks, one or more optical disks (e.g. CDs, DVDs, and Blu-Ray discs), and various other forms of computer readable media. Similarly, the storage drives may include solid state drives (SSDs), hard disk drives (HDDs), magnetic disk drives, and optical disk drives. In some implementations, the storage media may store a portion of the operating system, the application programs, the other programs, and the program data.

The system bus couples various system components, including the network interface, the I/O devices and the system memory, to the CPU. The system bus may be of any of several types of bus structures including a memory bus or memory controller, a peripheral bus, and a local bus using any of a variety of bus architectures. The storage drives and their associated computer-readable media provide nonvolatile storage of computer readable instructions, data structures, programs, and other data for the computer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, performed by a resource management server, for mapping a plurality of unassigned virtual machines (VMs) to a plurality of physical machines (PMs), the resource management server comprising a non-transient computer readable medium and a processor to execute computer executable instructions stored on the non-transient computer readable medium, so that when the instructions are executed, the resource management server performs the method of:
   obtaining total resource demands for each dimension requested by the plurality of unassigned VMs by combining resource demands in each respective dimension across all VMs in the plurality of unassigned VMs;
   activating, based on the total resource demands, at least one PM in the plurality of PMs to a set of activated PMs, wherein the activating comprises:
     (a) determining total unaccounted-for resource demands for each dimension, the unaccounted-for resource demands being resource demands that exceed total available resources of the set of activated PMs;
     (b) determining whether all resource demands have been accounted for based on the total unaccounted-for resource demands by:
       determining whether the total unaccounted-for resource demands in each dimension is less than zero; and
       when the total unaccounted-for resource demands in each dimension is less than zero, determining that all resource demands have been accounted for; and
     (c) in response to the determining that all resource demands have not been accounted for:
       determining dominant resource demand from the unaccounted-for resource demands, and
       activating a PM with a maximum capacity for the dominant resource;
   assigning at least one unassigned VM to the set of activated PMs by assigning each of the at least one unassigned VM to any PM in the set of activated PMs, wherein a VM assigned to a PM has an equal or lower resource demand for each dimension compared to a remaining resource capacity for each respective dimension of the PM;
   determining whether all unassigned VMs in the plurality of unassigned VMs have been assigned to the set of activated PMs; and
   conditionally activating one or more PMs when all unassigned VMs have not been assigned to the set of activated PMs.

2. The method of claim 1, wherein the PMs are grouped in two or more clusters, wherein PMs in a same cluster have the same hardware configuration.

3. The method of claim 1, wherein the dimensions are selected from the group consisting of: central processing unit (CPU), memory, and network input/output resources.

4. The method of claim 1, wherein activating the at least one PM in the plurality of PMs to the set of activated PMs further comprises:
repeating steps (a), (b), and (c) until all resource demands have been accounted for.

5. The method of claim 1, wherein determining the total unaccounted-for resource demands for each dimension comprises:
summing up resource capacity in each dimension of the PMs in the set of activated PMs to obtain total resource capacity in each dimension of the set of activated PMs; and
subtracting the total resource capacity in each dimension from the total resource demands in each dimension to obtain the total unaccounted-for resource demands for each dimension.

6. The method of claim 1, wherein the assigning at least one unassigned VM to the set of activated PMs comprises:
determining a VM search order for the dimensions based on a total remaining resource capacity of the activated PMs;
selecting from the unassigned VMs an unchecked VM with a maximum of the resource demands in the VM search order;
determining a PM search order for the dimensions based on the resource demands of the selected unchecked VM;
determining an assignment order of the PMs using the PM search order; and
assigning the selected VM to a PM in the activated PMs using the determined assignment order when the PM in the activated PMs has an equal or higher remaining resource capacity for each dimension compared to the resource demands for each dimension of the selected VM.

7. The method of claim 6, wherein determining the VM search order for the dimensions based on a total remaining resource capacity of the activated PMs comprises:
determining the VM search order based on a dominant total remaining resource, wherein the dominant total remaining resource is a dimension of the total remaining resource capacity with a maximum remaining resource capacity compared to other dimensions of the total remaining resource capacity.

8. The method of claim 6, wherein determining the PM search order for the dimensions based on the resource demands of the selected unchecked VM comprises:
determining the PM search order based on a dominant resource for the selected unchecked VM, wherein the dominant resource is the dimension of the resource demands of the selected unchecked VM with a maximum resource demand compared to other dimensions of the resource demands of the selected unchecked VM.

9. The method of claim 6, wherein the determining an assignment order of the PMs using the PM search order comprises:
ranking the activated PMs in an order of the remaining resource capacity in the PM search order, wherein a PM with a maximum remaining resource capacity in the first dimension of the PM search order is ranked higher than a PM with less remaining resource capacity in the first dimension.

10. The method of claim 6, wherein assigning the selected VM to a PM in the activated PMs using the determined assignment order comprises:
determining, using the assignment order, whether a PM can host the selected VM by comparing the resource demands of the selected VM to resource capacity of the PM for each dimension; and
selecting the first PM in the assignment order that can host the selected VM.

11. A resource management server, for mapping a plurality of unassigned virtual machines (VMs) to a plurality of physical machines (PMs), the resource management server comprising a non-transient computer readable medium and a processor to execute computer executable instructions stored on the non-transient computer readable medium, so that when the instructions are executed, the resource management server performs the method of:
obtaining total resource demands for each dimension requested by the plurality of unassigned VMs by combining resource demands in each respective dimension across all VMs in the plurality of unassigned VMs;
activating, based on the total resource demands, at least one PM in the plurality of PMs to a set of activated PMs, wherein the activating comprises:
(a) determining total unaccounted-for resource demands for each dimension, the unaccounted-for resource demands being resource demands that exceed total available resources of the set of activated PMs;
(b) determining whether all resource demands have been accounted for based on the total unaccounted-for resource demands by:
determining whether the total unaccounted-for resource demands in each dimension is less than zero; and
when the total unaccounted-for resource demands in each dimension is less than zero, determining that all resource demands have been accounted for; and
(c) in response to the determining that all resource demands have not been accounted for:
determining dominant resource demand from the unaccounted-for resource demands, and
activating a PM with a maximum capacity for the dominant resource;
assigning at least one unassigned VM to the set of activated PMs by assigning each of the at least one unassigned VM to any PM in the set of activated PMs, wherein a VM assigned to a PM has an equal or lower resource demand for each dimension compared to a remaining resource capacity for each respective dimension of the PM;
determining whether all unassigned VMs in the plurality of unassigned VMs have been assigned to the set of activated PMs; and
conditionally activating one or more PMs when all unassigned VMs have not been assigned to the set of activated PMs.

12. The resource management server of claim 11, wherein the dimensions are selected from the group consisting of: central processing unit (CPU), memory, and network input/output resources.

13. The resource management server of claim 11, further performing the method comprising:

repeating steps (a), (b), and (c) until all resource demands have been accounted for.

14. The resource management server of claim 11, further performing the method comprising:
   determining a VM search order for the dimensions based on a total remaining resource capacity of the activated PMs;
   selecting from the unassigned VMs an unchecked VM with a maximum of the resource demands in the VM search order;
   determining a PM search order for the dimensions based on the resource demands of the selected unchecked VM;
   determining an assignment order of the PMs using the PM search order; and
   assigning the selected VM to a PM in the activated PMs using the determined assignment order.

15. The resource management server of claim 11, wherein the PMs are grouped in two or more clusters, wherein PMs in a same cluster have the same hardware configuration.

* * * * *